(12) United States Patent
Morin et al.

(10) Patent No.: US 10,605,172 B2
(45) Date of Patent: *Mar. 31, 2020

(54) LOW NOISE TURBINE FOR GEARED GAS TURBINE ENGINE

(71) Applicant: United Technologies Corporation, Hartford, CT (US)

(72) Inventors: Bruce L. Morin, Springfield, MA (US); David A. Topol, West Hartford, CT (US); Detlef Korte, Munich (DE)

(73) Assignees: UNITED TECHNOLOGIES CORPORATION, Farmington, CT (US); MTU AERO ENGINES AG, Munich (DE)

( * ) Notice: Subject to any disclaimer, the term of this patent is extended or adjusted under 35 U.S.C. 154(b) by 1179 days.

This patent is subject to a terminal disclaimer.

(21) Appl. No.: 13/970,670

(22) Filed: Aug. 20, 2013

(65) Prior Publication Data
US 2014/0271112 A1 Sep. 18, 2014

Related U.S. Application Data

(60) Provisional application No. 61/781,170, filed on Mar. 14, 2013.

(51) Int. Cl.
*F02C 7/24* (2006.01)
*F02K 3/06* (2006.01)

(52) U.S. Cl.
CPC .................. *F02C 7/24* (2013.01); *F02K 3/06* (2013.01); *F05D 2200/36* (2013.01);
(Continued)

(58) Field of Classification Search
CPC .......... F02C 7/24; F02K 3/06; F05D 2210/31; F05D 2240/307; Y02T 50/673
(Continued)

(56) References Cited

U.S. PATENT DOCUMENTS 3,287,906 A 11/1966 McCormick
3,659,422 A 5/1972 Hope
(Continued)

FOREIGN PATENT DOCUMENTS

GB 1072145 6/1967
GB 1516041 6/1978
(Continued)

OTHER PUBLICATIONS

Mark H. Waters and Edward T., NASA Technical Memorandum: Analysis of Turbofan Propulsion System Weight and Dimensions, 1977.*
(Continued)

*Primary Examiner* — Ngoc T Nguyen
(74) *Attorney, Agent, or Firm* — Carlson, Gaskey & Olds, P.C.

(57) ABSTRACT

A gas turbine engine according to an exemplary aspect of the present disclosure includes, among other things, a turbine section including a fan drive turbine, a compressor section driven by the turbine section, a geared architecture driven by the fan drive turbine, and a fan driven by the fan drive turbine via the geared architecture. At least one stage of the turbine section includes an array of rotatable blades and an array of vanes. A ratio of the number of vanes to the number blades is greater than or equal to about 1.55. A mechanical tip rotational Mach number of the blades is configured to be greater than or equal to about 0.5 at an approach speed.

28 Claims, 1 Drawing Sheet

(52) U.S. Cl.
CPC .... *F05D 2210/31* (2013.01); *F05D 2240/301* (2013.01); *F05D 2240/307* (2013.01); *Y02T 50/673* (2013.01)

(58) Field of Classification Search
USPC .......................................................... 415/144
See application file for complete search history.

(56) References Cited

U.S. PATENT DOCUMENTS

| | | |
|---|---|---|
| 3,754,484 A | 8/1973 | Roberts |
| 3,892,358 A | 7/1975 | Gisslen |
| 4,130,872 A | 12/1978 | Harloff |
| 5,433,674 A | 7/1995 | Sheridan et al. |
| 5,447,411 A | 9/1995 | Curley et al. |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,814,541 B2 | 11/2004 | Evans et al. |
| 7,021,042 B2 | 4/2006 | Law |
| 7,591,754 B2 | 9/2009 | Duong et al. |
| 7,806,651 B2 | 10/2010 | Kennepohl et al. |
| 7,824,305 B2 | 11/2010 | Duong et al. |
| 7,891,943 B2 | 2/2011 | Tsuchiya et al. |
| 7,926,260 B2 | 4/2011 | Sheridan et al. |
| 8,205,432 B2 | 6/2012 | Sheridan |
| 8,246,292 B1 | 8/2012 | Morin et al. |
| 8,834,099 B1 | 9/2014 | Topol et al. |
| 2008/0022691 A1 | 1/2008 | Kennepohl et al. |
| 2010/0148396 A1 | 6/2010 | Xie et al. |
| 2010/0331139 A1 | 12/2010 | McCune |
| 2013/0025257 A1 | 1/2013 | Suciu et al. |
| 2013/0259654 A1 | 10/2013 | Kupratis et al. |
| 2014/0271112 A1 | 9/2014 | Morin et al. |

FOREIGN PATENT DOCUMENTS

| | | |
|---|---|---|
| GB | 2041090 | 9/1980 |
| WO | 2007038674 | 4/2007 |

OTHER PUBLICATIONS

U.S. Appl. No. 12/622,458, filed Nov. 20, 2009.
U.S. Appl. No. 13/590,328, filed Sep. 28, 2012.
U.S. Appl. No. 13/630,276, filed Aug. 21, 2012.
International Preliminary Report on Patentability for PCT Application No. PCT/US2014/022512, dated Sep. 24, 2015.
International Search Report and Written Opinion for PCT Application No. PCT/US2014/022512, dated Jul. 28, 2014.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C: Taylor & Francis.
Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau K., Gu, C. and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010.

(56) References Cited

OTHER PUBLICATIONS

File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress Al-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, Dr. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Roux, Elodie, Turbofan and Turbojet Engines: Database Handbook, copyright: 2007, p. 1-595, Editions Elodie Roux, France, printed by lulu.com.
Extended European Search Report for Application No. 16152992.0 dated Jun. 20, 2016.
Waters, Mark H., et al, Analysis of Turbofan Propulsion System Weight and Dimensions, NASA TM X-73,199, Jan. 31, 1977, pp. 1-65, XP55306421, Retrieved from the Internet on Sep. 29, 2016 at URL:http://ntrs.nasa.gov/archive/nasa/casi.ntrs.nasa.gov/19770012125.pdf.
Gliebe, Philip R. et al, Ultra-High Bypass Engine Aeroacoustic Study, NASA CR-2003-212525, Oct. 1, 2003, XP55277347, Retrieved from the Internet on Jun. 2, 2016 from URL:http://ntrs.nasa.gov/archive/nasa/casi.ntrs.nasa.gov/20040000741.pdf.
Riegler, C., et al, The Geared Turbofan Technology—Opportunities, Challenges and Readiness Status, Proceedings CEAS 2007, Sep. 11, 2007, XP055195802.
European Search Report for Application No. 14775864.3 dated Sep. 29, 2016.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.comidocs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.

\* cited by examiner

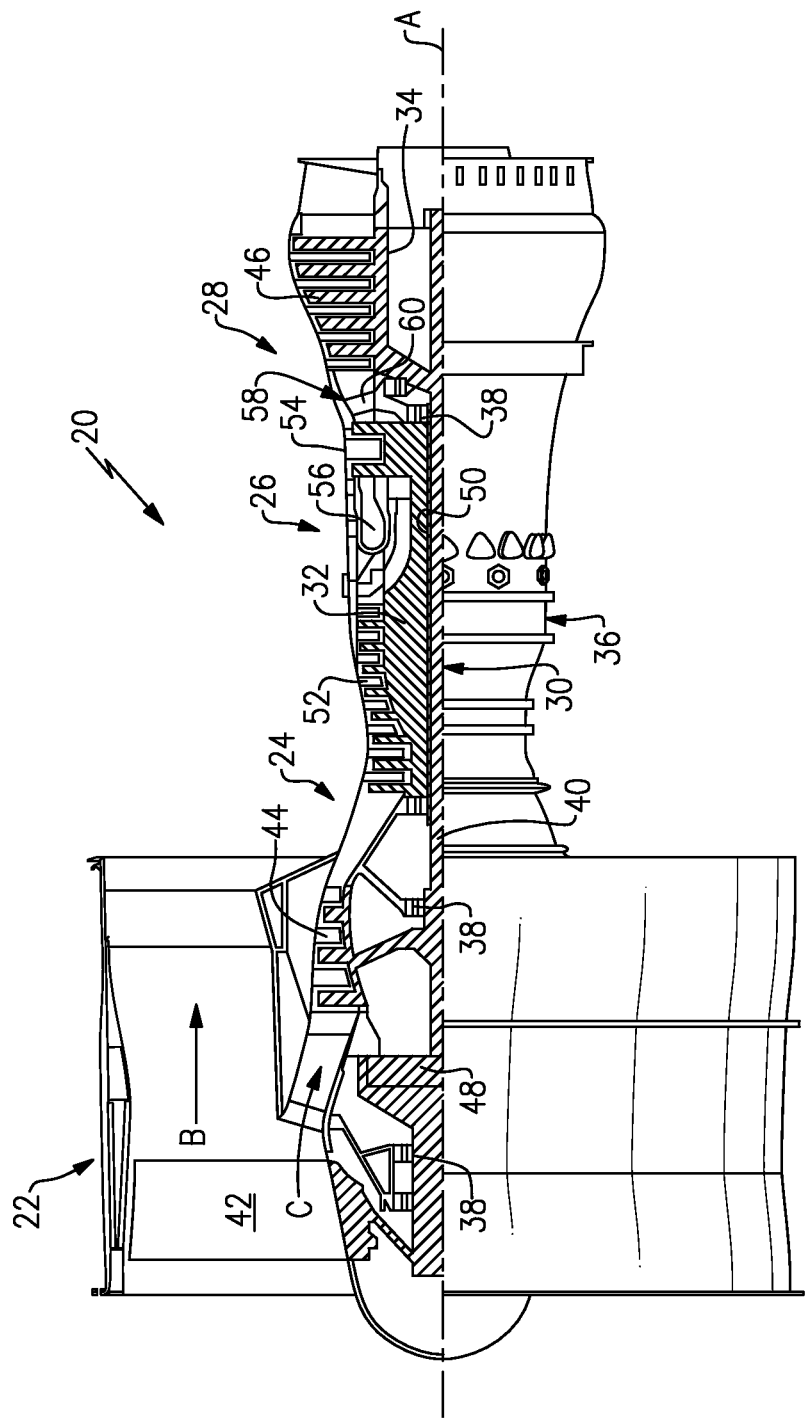

LOW NOISE TURBINE FOR GEARED GAS TURBINE ENGINE

CROSS-REFERENCE TO RELATED APPLICATIONS

This application claims priority to U.S. Provisional Application No. 61/781,170, which was filed on 14 Mar. 2013 and is incorporated herein by reference.

BACKGROUND

This disclosure relates to the design of a lower noise gas turbine engine turbine.

Gas turbine engines are known, and typically include a fan delivering air into a compressor. The air is compressed in the compressor and delivered downstream into a combustor section where it is mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades that rotate with the rotor. Interspersed between the rows of turbine blades are vanes.

The high pressure turbine rotor has typically driven a high pressure compressor rotor, and the low pressure turbine rotor has typically driven a low pressure compressor rotor. Each of the compressor rotors also include a number of compressor blades that rotate with the rotors. There are also vanes interspersed between the rows of compressor blades.

The low pressure turbine or compressor can be a significant noise source, as noise is produced by fluid dynamic interaction between the blade rows and the vane rows. These interactions produce tones at a blade passage frequency of each of the low pressure turbine rotors, the low pressure compressor rotors, and their harmonics.

Historically, the low pressure turbine has driven both a low pressure compressor section and a fan section. More recently, a gear reduction has been provided such that the fan and low pressure compressor can be driven at distinct speeds.

With the inclusion of a gear, low pressure turbine speeds have increased. Thus, to "cutoff" these turbines, vane-to-blade ratios must be higher than for turbines in a conventional engine.

SUMMARY

A gas turbine engine according to an exemplary aspect of the present disclosure includes, among other things, a turbine section including a fan drive turbine, a compressor section driven by the turbine section, a geared architecture driven by the fan drive turbine, and a fan driven by the fan drive turbine via the geared architecture. At least one stage of the turbine section includes an array of rotatable blades and an array of vanes. A ratio of number of vanes to the number blades is greater than or equal to about 1.55. A mechanical tip rotational Mach number of the blades is configured to be greater than or equal to about 0.5 at an approach speed.

In a further non-limiting embodiment of the foregoing gas turbine engine, the vanes of the at least one stage are immediately upstream or downstream from the blades.

In a further non-limiting embodiment of any of the foregoing gas turbine engines, the gas turbine engine is rated to produce 15,000 pounds of thrust or more.

In a further non-limiting embodiment of any of the foregoing gas turbine engines, the at least one stage comprises a stage of a low pressure turbine.

In a further non-limiting embodiment of any of the foregoing gas turbine engines, the at least one stage comprises each stage of a low pressure turbine.

In a further non-limiting embodiment of any of the foregoing gas turbine engines, the gear reduction has a gear ratio of greater than about 2.3.

In a further non-limiting embodiment of any of the foregoing gas turbine engines, the fan delivers air into a bypass duct, and a portion of air into the compressor section, with a bypass ratio defined as the volume of air delivered into the bypass duct compared to the volume of air delivered into the compressor section, and the bypass ratio being greater than about six (6).

In a further non-limiting embodiment of any of the foregoing gas turbine engines, the bypass ratio is greater than about ten (10).

In a further non-limiting embodiment of any of the foregoing gas turbine engines, the turbine section is a turbine section of a three-spooled gas turbine engine.

A turbine section of a geared gas turbine engine according to an exemplary aspect of the present disclosure includes, among other things, at least one stage having a ratio of vanes to blades that is greater than or equal to about 1.55. The blades are configured to operate at a mechanical tip rotational Mach number that is greater than or equal to about 0.5 at an approach speed.

In a further non-limiting embodiment of the foregoing turbine section, the vanes of the at least one stage are immediately upstream or downstream from the blades.

In a further non-limiting embodiment of any of the foregoing turbine sections the geared gas turbine engine is rated to produce 15,000 pounds of thrust or more.

In a further non-limiting embodiment of any of the foregoing turbine sections, the at least one stage comprises a stage of a low pressure turbine.

In a further non-limiting embodiment of any of the foregoing turbine sections, the at least one stage comprises each stage of a low pressure turbine.

A method of expansion in a gas turbine according to another exemplary aspect of the present disclosure includes, among other things, providing at least one stage of a turbine section of a geared gas turbine engine, the at least one stage having a ratio of vanes to blades that is greater than or equal to about 1.55. The mechanical tip rotational Mach number is configured to be greater than or equal to 0.5 at the approach speed.

In a further non-limiting embodiment of the foregoing method, the at least one stage comprises at least one stage of a low pressure turbine.

These and other features of this disclosure will be best understood from the following specification and drawings, the following of which is a brief description.

BRIEF DESCRIPTION OF THE DRAWINGS

FIG. 1 shows an example gas turbine engine.

DETAILED DESCRIPTION

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } °R)/(518.7° \text{ R})]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure turbine 46. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused by a desire to not have unduly high fan speeds.

In geared gas turbine engines, such as the engine 20, a careful design between the number of vanes and blades in the low pressure turbine 46, and the mechanical tip rotational Mach number of the low pressure turbine 46 can be selected to reduce turbine noise through the use of the mechanism referred to as "cutoff." This "cutoff" mechanism occurs when the vane-to-blade ratio is selected such that the fundamental blade passage tone is prevented from propagating to the far-field. This mechanism has been used previously in non-geared engines, which have low pressure turbines that operate at low tip Mach numbers, typically no greater than 0.5. However, "cutoff" has not been used in geared engines, such as those described herein, which have low pressure turbines that operate at high tip Mach numbers, typically greater than 0.5. On geared engines with such turbines, the "cutoff" mechanism requires a larger vane-to-blade ratio than it would on non-geared engines.

The mechanical tip rotational Mach number, $M_{tip}$, is generally defined as:

$$M_{tip} = \frac{\pi}{720c} DN$$

wherein N is a rotor rotational speed in revolutions per minute, c is the local speed of sound in feet per second and D is the local tip diameter in inches.

The mechanical tip rotational Mach number for any blade row may be calculated in this manner.

Although described with reference to the two-spool engine 20, the relationship between the number of vanes and blades in the low pressure turbine 46, and the mechanical tip rotational Mach number of the low pressure turbine 46 may be applicable to three-spool direct drive engines or three-spool engines having a gear reduction as well.

In the example engine 20, a ratio of the number of vanes to blades in a stage of the low pressure turbine is greater than or equal to $R_A$. In this example, a mechanical tip rotational Mach number of the blade of the low pressure turbine is greater than or equal to $M_A$ at approach speed. In the example engine 20, $R_A$ is about 1.55 and $M_A$ is about 0.5. This novel design will result in reduced low pressure turbine noise because at least one stage of the low pressure turbine is "cutoff" at its rotor blade passing frequency.

The stage including the vanes and blades greater than or equal to $R_A$, can be any stage of the low pressure turbine 46.

The stage may also be a stage of the high pressure turbine 54, or, if present, an intermediate pressure turbine. In a high or intermediate pressure turbine example, $R_A$ may be greater than or equal to 1.55.

It is envisioned that all of the stages in the low pressure turbine 46 (or high pressure turbine 54 or, if present, an intermediate pressure turbine) would include a ratio of vanes to blades that is greater than or equal to $R_A$. However, this disclosure may also extend to turbines wherein only one of the stages has a ratio of vanes to blades that is greater than or equal to $R_A$. This disclosure also extends to turbines wherein more than one, but less than all, of the stages has a ratio of vanes to blades that is greater than or equal to $R_A$.

The mechanical tip rotational Mach number is measured at engine operating conditions corresponding to one or more of the noise certification points defined in Part 36 of the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

The disclosed examples are most applicable to jet engines rated to produce 15,000 pounds (66,723 N) of thrust or more.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine, comprising:
   a turbine section including a fan drive turbine;
   a compressor section driven by the turbine section;
   a geared architecture driven by the fan drive turbine; and
   a fan driven by the fan drive turbine via the geared architecture;
   wherein at least one stage of the turbine section includes an array of rotatable blades and an array of vanes, and
   wherein a ratio of the number of vanes to the number of blades of the at least one stage is greater than or equal to 1.55, and
   wherein a mechanical tip rotational Mach number of the blades is configured to be greater than or equal to 0.5 at an approach speed.

2. The gas turbine engine of claim 1, wherein the vanes of the at least one stage are immediately upstream or downstream from the blades.

3. The gas turbine engine of claim 1, wherein the gas turbine engine is rated to produce 15,000 pounds of thrust or more.

4. The gas turbine engine of claim 1, wherein the at least one stage comprises a stage of the fan drive turbine.

5. The gas turbine engine of claim 1, wherein the at least one stage comprises each stage of the fan drive turbine.

6. The gas turbine engine of claim 1, wherein the gear reduction has a gear ratio of greater than or equal to 2.3.

7. The gas turbine engine of claim 1, wherein the fan delivers air into a bypass duct, and a portion of air into the compressor section, with a bypass ratio defined as the volume of air delivered into the bypass duct compared to the volume of air delivered into the compressor section, and the bypass ratio being greater than or equal to six (6).

8. The gas turbine engine of claim 7, wherein the bypass ratio is greater than or equal to ten (10).

9. The gas turbine engine of claim 1, wherein the turbine section is a turbine section of a three-spooled gas turbine engine.

10. A turbine section of a geared gas turbine engine, comprising:
    at least one stage having a ratio of vanes to blades that is greater than or equal to 1.55, wherein the blades are configured to operate at a mechanical tip rotational Mach number that is greater than or equal to 0.5 at an approach speed.

11. The turbine section of claim 10, wherein the vanes of the at least one stage are immediately upstream or downstream from the blades.

12. The turbine section of claim 10, wherein the geared gas turbine engine is rated to produce 15,000 pounds of thrust or more.

13. The turbine section of claim 10, wherein the at least one stage comprises a stage of a low pressure turbine.

14. The turbine section of claim 10, wherein the at least one stage comprises each stage of a low pressure turbine.

15. A method of providing a portion of a gas turbine engine comprising:
providing at least one stage of a turbine section of a geared gas turbine engine, the at least one stage having a ratio of vanes to blades that is greater than or equal to 1.55, wherein a mechanical tip rotational Mach number of the blades is configured to be greater than or equal to 0.5 at an approach speed.

16. The method of claim 15, wherein the at least one stage comprises at least one stage of a low pressure turbine.

17. A gas turbine engine, comprising:
a turbine section including a fan drive turbine;
a compressor section driven by the turbine section;
a geared architecture driven by the fan drive turbine; and
a fan driven by the fan drive turbine via the geared architecture;
wherein at least one stage of the turbine section includes an array of rotatable blades and an array of vanes, and
wherein a ratio of the number of vanes to the number of blades is greater than or equal to 1.55, and
wherein a mechanical tip rotational Mach number of the blades is configured to be greater than or equal to 0.5 at an approach speed, and
wherein the vanes of the at least one stage are immediately upstream or downstream from the blades, and
wherein the gas turbine engine is rated to produce 15,000 pounds of thrust or more.

18. The gas turbine engine of claim 17, wherein the fan drive turbine includes a plurality of stages, and the at least one stage comprises at least one stage of the plurality of stages of the fan drive turbine.

19. The gas turbine engine of claim 18, wherein the at least one stage comprises each stage of the fan drive turbine.

20. The gas turbine engine of claim 19, wherein the gear reduction has a gear ratio of greater than or equal to 2.3.

21. The gas turbine engine of claim 20, wherein the fan delivers air into a bypass duct, and a portion of air into the compressor section, with a bypass ratio defined as the volume of air delivered into the bypass duct compared to the volume of air delivered into the compressor section, and the bypass ratio being greater than or equal to six (6).

22. The gas turbine engine of claim 21, wherein the bypass ratio is greater than or equal to ten (10).

23. The gas turbine engine of claim 22, wherein the turbine section is a turbine section of a three-spooled gas turbine engine.

24. The gas turbine engine of claim 23, wherein the fan drive turbine has a pressure ratio greater than five (5).

25. The gas turbine engine of claim 18, wherein:
the at least one stage of the fan drive turbine comprises more than one stage, of the plurality of stages of the fan drive turbine;
the fan has less than twenty (20) fan blades;
the fan drive turbine has at least three (3) stages, but no more than six (6) stages;
the fan drive turbine has a pressure ratio greater than five (5); and
the fan delivers air into a bypass duct, and a portion of air into the compressor section, with a bypass ratio defined as the volume of air delivered into the bypass duct compared to the volume of air delivered into the compressor section, and the bypass ratio being greater than or equal to ten (10).

26. The gas turbine engine of claim 17, wherein the at least one stage comprises only one stage of a high pressure turbine.

27. The gas turbine engine of claim 22, wherein the fan has less than twenty (20) fan blades, the fan drive turbine has a pressure ratio greater than five (5), and the fan drive turbine has at least three (3) stages, but no more than six (6) stages.

28. The gas turbine engine of claim 27, wherein the turbine section includes a high pressure turbine having a plurality of stages.

* * * * *